United States Patent Office 3,544,308
Patented Dec. 1, 1970

3,544,308
METHOD OF PRODUCING ASBESTOS-FELT
BODIES HAVING ELASTIC PROPERTIES
Franz Josef Rohr, Ober-Absteinach, Germany, assignor to Brown, Boveri & Cie A.G., Mannheim-Kafertal, Germany, a corporation of Germany
No Drawing. Filed Mar. 15, 1968, Ser. No. 713,330
Int. Cl. B22f 3/14
U.S. Cl. 75—206     7 Claims

ABSTRACT OF THE DISCLOSURE

A method is described for producing formed asbestos-felt bodies or elements having elasticity and other desirable properties. The asbestos raw material is saturated with a metallic salt solution and then dried. The metal salt dissociates during heating of the material in a controlled atmosphere which is reducing or inert. To further improve the mechanical properties of the asbestos-felt body or elements, the material thereof is pulverized and compressed to form it into a desired molded shape by sintering. A further feature of the invention includes carrying out the heating step in a reducing or inert atmosphere, in such manner that the metal salt is reduced to the corresponding metal. According to still another feature, the felt-asbestos material is subjected to compression so as to form it into sealing rings having sealing properties for joints, and discs having filtering properties. Depending upon the selected metallic salt employed, it is also possible to have the resulting formed body endowed with catalytic properties. According to the process, the asbestos material is impregnated with a solution of the selected metallic salt. The salt precipitates on the surface of the particles of asbestos-felt material. Subsequent sintering, when added as a step, causes the particles of the material to become welded together at their mutual points of contacts. The density as well as the porosity of the product can be controlled by varying the pressure and temperature of the sintering step. At a sufficiently high degree of compression, the individual particles of the asbestos-felt material becomes closely welded together so that the resulting formed body or element is rendered gas-impermeable. Examples of salts which may be employed in the process are: magnesium nitrate (which dissociates to become magnesium oxide) and silver nitrate (which dissociates to form silver oxide and subsequently metallic silver). Other examples are gold or platinum metallic salts, which dissociate to form the metals of the respective salts. Compression of the material in a hollow cylindrical piston produces shaped discrete ring bodies which are endowed with gas-tight sealing properties when made dense; or with partial filtering properties when made as porous discs.

FIELD OF THE INVENTION

The present invention relates to a method of producing asbestos-felt bodies or elements having elastic properties, and the bodies or elements formed thereby.

DESCRIPTION OF THE PRIOR ART

Asbestos felt is sometimes used to seal off individual portions of devices wherein physical and chemical processes are taking place. Due to the partly different expansion coefficients of ceramic and metal parts, it becomes impossible, in many instances, to durably connect said parts in a gas-tight and moisture-proof manner by means of welding or soldering. Asbestos felt, when used as a sealing material, entails certain disadvantages due to its fibrous structure. No sealing or packing members can be produced by means of pressing, stamping or punching of the asbestos-felt material of the prior art. Nor is it possible to produce, from asbestos felt, a sealing ring of small annular width and thickness and having a large diameter, which ring can provide a tight seal against gas leakage. Furthermore, it is not easy to join together in this manner, a plurality of metal parts into a gas-tight connection and to ensure, at the same time, good electrical conductivity at the junction or connection point.

SUMMARY OF THE INVENTION

It is therefore an object of the present invention to eliminate these disadvantages of the prior art and to simultaneously change the characteristics of asbestos-felt material in such a way that the changed material would have elastic properties and would become, depending on the desired properties and requirements, either an insulator or an electrical conductor. Depending on the particular kind of impregnation, the sealing material may for example be provided with good electron- or ion-conductivity, high electrical resistance, high or low heat conductivity or thermal expansion, chemical resistance to chemical reagents, or catalytic properties.

The method of the present invention comprises essentially the steps of impregnating asbestos-felt material by saturating it with a selected metallic salt solution, then drying and heating the saturated material. During the drying and heating operation the metallic salt dissociates as further explained below. Then the material is formed into a body or element of discrete shape by heating it in a controlled atmosphere, which may be a reducing atmosphere or an inert atmosphere. To further improve the mechanical properties of the product, the asbestos-felt body or element may be pulverized and the pulverulent material compressed and formed into the shape of molded elements by sintering.

According to the invention, the asbestos-felt body may be subjected to controlled compression in such manner that its particles are joined to each other to make the body porous, so that the body achieves overall or partial filtering or sealing characteristics, depending upon the degree of compression and temperature. Furthermore, depending upon the particular metallic salt which is employed, the formed or molded body may also be endowed, following its manufacture, with additional catalytic qualities.

During the process, after the solvent is withdrawn or removed, the metallic salt precipitates upon the surface of the individual felt particles. During the subsequent sintering process, the felt type of asbestos particles, which are either partially or completely enveloped in the respective metal or metal oxide, become welded together with each other at their mutual points of contact. The resulting porosity of the product formed of these particles depends, on the one hand, on the ductility of the metal employed and, on the other hand, on the temperature and pressure used during the sintering operation. At a sufficiently high pressure, the individual particles become so welded with each other that the formed body becomes gas-impermeable.

ILLUSTRATIVE EXAMPLES

The present invention will be more clearly understood from a consideration of the following illustrative examples.

Example 1

The felt-asbestos material is impregnated with a silver nitrate solution and, after being dried in air atmosphere, is heated to 500° C. In this manner the silver nitrate is dissociated to silver oxide, and the latter is further dissociated to metallic silver. The impregnated felt-asbestos body is formable to desired shapes and has properties which permit it to be formed and molded under pressure by a series of presses or stamping operations, to be formed into current-conducting sealing rings or gaskets.

In accordance with the method of the present invention, the felt-asbestos body may be pulverized and the pulverulent material subjected to pressure in the compression mold to be shaped by compression into a formed body, for example by being pressed into an annular ring or disc, and by being sintered under conditions of heat and pressure.

The resulting product of this example is electrically-conductive and may be in the form of a felt-asbestos ring or disc and may serve, for example, as current collectors and sealing members in high temperature fuel cells and similar types of installations.

Example 2

The felt-asbestos body produced in accordance with Example 2 above is then pulverized into particles having the smallest possible equal diameters. The particles are then charged into a cylindrical compression mold having one end thereof sealed by a plate. A first hollow cylindrical piston is fitted into the cylindrical mold so as to seal off, under high pressure, the peripheral region of the charged material. A second cylindrical piston, fits inside the first piston and seals off the circular interior region of the charged material. Heat and pressure are applied, and a sintered body is thus formed. The body thus produced has a dense annular edge region which can serve as a gas-impermeable sealing ring, while its central portion, being more porous, serves as a filter.

The formed bodies produced in accordance with the invention have mechanical strength and properties which permit them to be machined and drilled or bored, and by heating to specified temperatures can also be hardened or strengthened.

The products made in accordance with the above-described methods can be used at various working temperatures and have predetermined selected physical and chemical properties, depending primarily on the type of impregnation material used. Thus, for example, the silver-impregnated formed bodies resulting from Example 2 may be employed in practice at temperatures up to 900° C. On the other hand, when the felt-asbestos material is impregnated with gold metal, the resulting formed bodies may be employed in practice at temperatures up to 1,000° C.; and platinum-impregnated formed bodies may be employed up to a temperature of 1,100° C.

I claim:
1. Method of producing asbestos-felt elements having elastic properties, comprising the steps of impregnating asbestos-felt material with a metallic salt solution, drying the resulting product, heating the product in a controlled atmosphere to dissociate the metallic salt leaving the metallic component and compression molding while simultaneously heating the asbestos felt and metallic component in a controlled atmosphere so as to form the material into sealing or filter elements.

2. Method according to claim 1, said controlled atmosphere being a reducing atmosphere.

3. Method according to claim 1, said atmosphere being an inert atmosphere.

4. Method according to claim 2, including the step of controlling said heating step and said reducing atmosphere so that the metallic salt is reduced to the corresponding metal.

5. Method according to claim 3, said heating step and said inert atmosphere being controlled in such manner as to reduce the metallic salt to the corresponding metal.

6. Method according to claim 1, the metal of said metallic salt having inherent catalytic characteristics so that the compression-formed element obtains additional catalytic characteristics.

7. Method according to claim 1, said metallic salt solution being a solution of a salt selected from the group magnesium nitrate, silver nitrate, gold salts and platinum salts.

References Cited

UNITED STATES PATENTS

| 1,937,728 | 12/1933 | Storch | 252—454 XR |
| 2,369,502 | 2/1945 | Walker | 106—36 |
| 2,784,085 | 3/1957 | Denning | 264—122 |
| 2,903,787 | 9/1959 | Brennan | 29—419 |
| 3,038,248 | 6/1962 | Kremer | 29—419 |

BENJAMIN R. PADGETT, Primary Examiner

A. J. STEINER, Assistant Examiner

U.S. Cl. X.R.

75—208, 224, 225, 226; 29—419

PO-1050
(5/69)

UNITED STATES PATENT OFFICE
CERTIFICATE OF CORRECTION

Patent No. 3,544,308   Dated December 1, 1970

Inventor(s) Franz Josef Rohr

It is certified that error appears in the above-identified patent and that said Letters Patent are hereby corrected as shown below:

After the name and address of the assignee insert the following:

-- Claims priority, application Germany, March 18, 1967, B-91 679 --.

SIGNED AND
SEALED
FEB 3 1971

(SEAL)
Attest:

Edward M. Fletcher, Jr.
Attesting Officer

WILLIAM E. SCHUYLER, JR.
Commissioner of Patents